United States Patent [19]

Clements et al.

[11] Patent Number: 5,151,119

[45] Date of Patent: Sep. 29, 1992

[54] COOLING OF MOLDED ARTICLES WITH A MIXTURE OF EVAPORATED CRYOGEN AND DRIED AIR

[75] Inventors: Stephen Clements, Wetherby; Brian King, Godalming, both of England

[73] Assignee: The BOC Group plc, Windlesham, England

[21] Appl. No.: 663,234

[22] Filed: Feb. 28, 1991

[30] Foreign Application Priority Data

Mar. 1, 1990 [GB] United Kingdom ............... 9004640

[51] Int. Cl.⁵ .............................................. C03B 9/00
[52] U.S. Cl. ........................................ 65/84; 65/85; 65/348; 65/69; 62/52.1
[58] Field of Search ............... 65/84, 85, 119, 3, 9, 65/348, 262, 68, 69; 62/320, 52.1, 50.5, 50.2

[56] References Cited

U.S. PATENT DOCUMENTS

| | | | |
|---|---|---|---|
| 4,481,780 | 11/1984 | Delano | 62/50.2 |
| 4,652,292 | 3/1987 | Ziegler | 65/84 |
| 4,729,779 | 3/1988 | De Vasselot | |
| 4,812,156 | 3/1989 | Virey | 65/319 |

*Primary Examiner*—Kenneth M. Schor
*Assistant Examiner*—John Hoffmann
*Attorney, Agent, or Firm*—Coleman R. Reap; Larry R. Cassett

[57] ABSTRACT

A method of forming glass containers, including the steps of drying a stream of air, passing the dried air into a vacuum-insulated mixing chamber, evaporating liquid cryogen in the mixing chamber, allowing the resulting cryogen vapor to mix with the air to form a mixture at a temperature below $-20°$ C., passing the gas mixture into a vacuum-insulated manifold, and causing the gas mixture to flow from the manifold and into the insides of glass containers being formed in molds to cool the containers.

8 Claims, 1 Drawing Sheet

U.S. Patent
Sep. 29, 1992
5,151,119
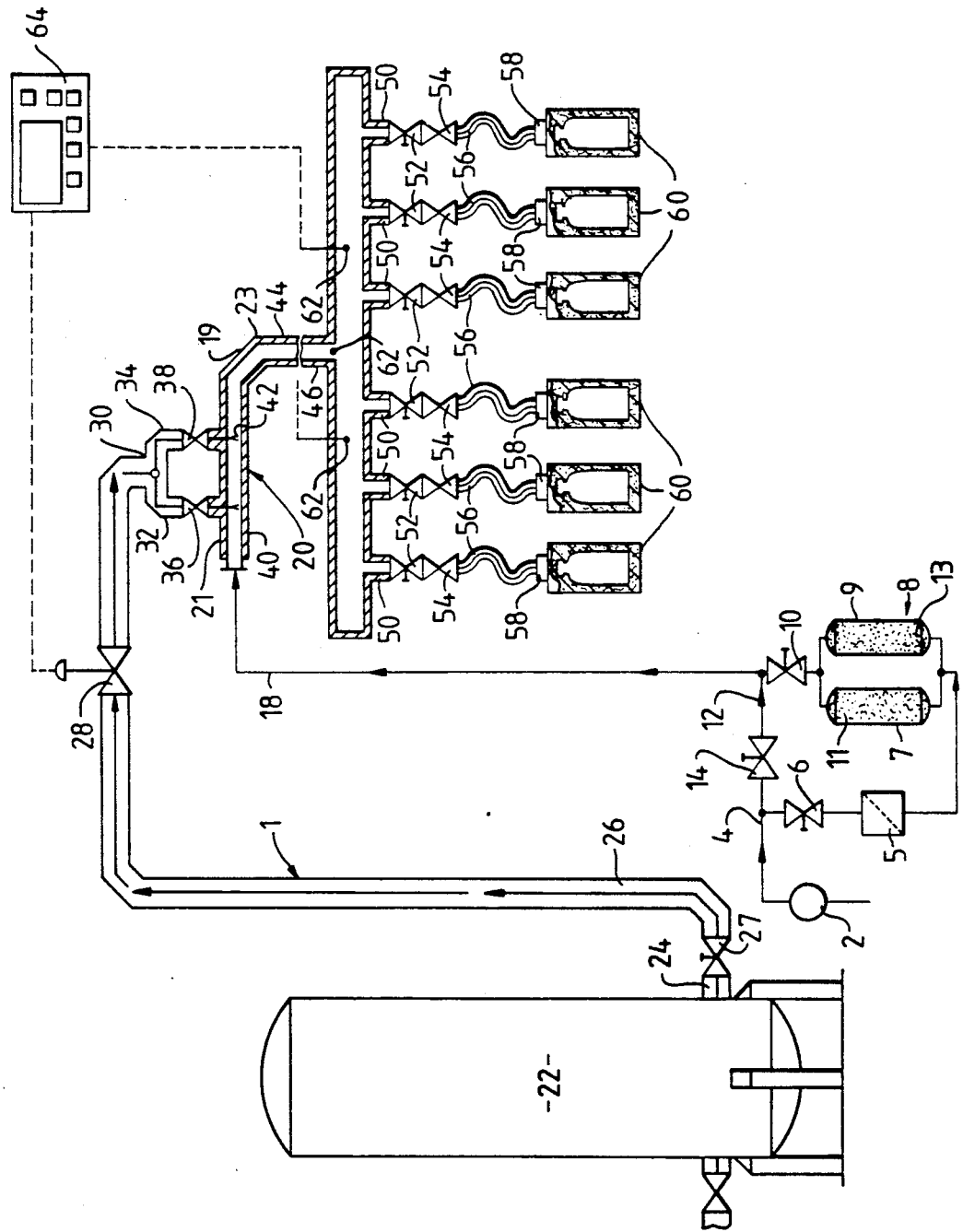

COOLING OF MOLDED ARTICLES WITH A MIXTURE OF EVAPORATED CRYOGEN AND DRIED AIR

BACKGROUND OF THE INVENTION

This invention relates to the manufacture of glass articles, particularly glass containers or other shaped glass objects having an inner wall defining a cavity which is accessible from the outside.

There are two main methods of making glass containers such as bottles: the "press and blow" method and the "blow and blow" method. In the press and blow method a gob of molten glass drops into a blank mould. A plunger rises and presses the gob into the shape of a neck ring and the blank mould. The mould opens and the partially formed bottle is released and inverted through 180°. While being transferred to a second mould, called the blow mould. Air is then injected under pressure into the hollow preformed bottle to form it into its final shape. In the blow and blow method the gob of molten glass is guided into a blank parison mould. As it settles in the mould, the neck of the bottle is formed with the bottle in an inverted attitude. Air is then injected into the mould through the neck to make a partial bottle shape. As in the press and blow method, the mould then opens and the partially formed bottle is released and inverted through 180°. The bottle is transferred to a blow mould and more air is injected to blow the bottle into its final shape.

PRIOR ART

U.S. Pat. Nos. 4,553,999, 4,652,292 and 4,708,730 relate to an improvement that is applicable to both the blowing stage of the "press and blow" method and the second blowing stage of the "blow and blow" method. In this improvement, a flow of pressurised cooling gas which has a temperature substantially below that of ambient air is introduced into the interior of a hollow glass article being formed in a mould so as to cool directly the interior portions of the molten glass therein and hasten the solidification of the glass. The cold gas may be supplied either at the end of the blowing stage, or may itself be used as the blowing gas. The flow of pressurised cooling gas is provided from an insulated manifold from which the pressurised gas can be withdrawn and introduced into several glass articles being formed on the same machine at the same time. The manifold is supplied with a mixture of dried ambient air and cold cryogen vapour. The main advantage that this method offers is that it enables a fractional reduction to be made to the total moulding time, thereby offering a productivity increase to manufacturers of glass articles such as bottles.

The cold cryogen vapour (i.e. nitrogen vapour) is taken as such from a vessel and passed to a supply header. A part of the nitrogen vapour is used to reduce the temperature of an incoming pressurised air stream to about 50° F. by being directly introduced into a conduit that conducts the air to a dehumidifier. The resulting relatively dry air passes to a T joint and vents to a pair of conduits in both of which it is mixed with further portions of cryogen vapour. The introduction of the cryogen vapour into these conduits is controlled by a plurality of flow control valves. The conduits terminate respectively in opposite ends of the insulated manifold which supplies the gas to the moulds via dropping conduits. A temperature control system is provided to maintain the temperature of the glass in the manifold within chosen limits. According to U.S. Pat. Nos. 4,652,292 and 4,708,730, the temperature of the gas mixture that is introduced into the manifold is preferably about 30° to 34° F. ($-1°$ to $+1°$ C.).

The above apparatus suffers from two main disadvantages. First, its use of cryogen is relatively inefficient. Second, difficulties will arise if it is attempted to operate the apparatus at a temperature significantly below 0° C. The cryogen vapour is inevitably formed by evaporating a cryogenic liquid. It is undesirable to form the cryogen vapour upstream of where it is to be mixed with the incoming air: this wastes a major portion of the refrigerative capacity of the cryogen. Moreover the relatively long cryogen flow path to the blow moulding machine results in there being a tendency for the cryogen to absorb a considerable quantity of heat from the surrounds. Second, this tendency for the temperature of the cold gas to rise during its passage from a source of cryogen vapour to the conduit which serves the blow moulding machine. It is this tendency for the temperature to rise which makes it difficult to operate the apparatus as described in the aforesaid U.S. patent specifications at temperatures substantially below 0° C. Typically, even in relatively small glass moulding machines, there are six separate blow moulding stations in line with one another with the consequence that the manifold is typically at least 5 meters in length. The environment in which the manifold is located in inevitably a hot one. There tend to be irregular and unpredictable convection currents in the general area of the manifold. Accordingly, as the cold mixture of air and cryogen vapour enters the manifold from its ends, so it tends to be warmed as it flows towards the centre. (Indeed, there is even a tendency for the mixture to leave the respective ends of the mixing chamber at different temperatures. U.S. Pat. Nos. 4,652,292 and 4,708,730 disclose a means which is able to guard against this tendency. Separate temperature controls are employed at the two ends of the manifold, but this involves additional complexity.) The tendency for different temperatures to be created at different positions within the manifold results, we believe in the gas entering the different moulds of the same machine being at different temperatures. This, we believe, makes it very difficult for the operator of the machine to ensure that all the bottles produced are of acceptable quality. It is accordingly very desirable to maintain uniform temperature conditions in each of the conduits that drop from the manifold and that supply the heads of the blow moulding machine. It will be appreciated that as the temperature difference between the ambient atmosphere and the gas supplied in the manifold increases, so the tendency for non-uniform temperatures to be created along the length of the manifold increases and therefore it becomes progressively more difficult to maintain production.

It is an aim of the present invention to provide a method and apparatus that ameliorate these difficulties and at the same time enable uniform temperatures substantially below 0° C. to be created along the length of the manifold these results being achievable with a remarkably low consumption of liquid cryogen (normally liquid nitrogen).

SUMMARY OF THE INVENTION

According to the present invention there is provided a method of forming glass containers, including the steps of drying a stream of air, passing the dried air into a vacuum-insulated mixing chamber, evaporating liquid cryogen in the mixing chamber, allowing the resulting cryogen vapour to mix with the air to form a mixture at a temperature below $-20°$ C., passing the gas mixture into a vacuum-insulated manifold, and causing the gas mixture to flow from the manifold and cool the insides of a plurality of glass containers being formed.

The invention also provides apparatus for forming glass containers, including a drier for drying a stream of air, a vacuum-insulated mixing chamber having one inlet in communication with an outlet of the drier and having at least one other inlet for liquid cryogen, whereby in use the cryogen evaporates and a gas mixture of air and vaporised liquid cryogen is formed in the mixing chamber, and a vacuum-insulated manifold having an inlet in communication with the mixing chamber and having a plurality of outlets being able each to be placed in communication with the inside of a respective glass container being formed.

The use of the method and apparatus according to the invention makes it possible to achieve significant advances in the quality or rate of production of glass containers or both. The sub-zero temperatures that make it possible for these advances to be effected can be achieved in the manifold with a consumption of liquid cryogen that is unexpectedly of a relatively small size having regard to the consumption of liquid cryogen that is associated at manifold temperatures of about 0° C. in the aforementioned prior art process described in U.S. Pat. Nos. 4,553,999, 4,652,292 and 4,708,730. We believe our invention is particularly useful in the light of the low gas flow rates that are associated with the operation of machines for making glass moulds. These flow rates are generally less than 2.5 standard cubic meters per minute per blowing head associated with the machine, so that even with large machines that may have 12 or more such heads, the overall flow rate of gas into the manifold is small. We have typically found it possible to achieve temperatures below minus 20° C. in the manifold at a high liquid cryogen utilisation without chilling the air during drying. Such loss of efficiency that does occur is typically mainly attributable to losses not associated with the apparatus according to the invention, (i.e. losses occasioned during the delivery of liquid cryogen to a storage tank, the storage of liquid cryogen, and the passage of liquid cryogen from the storage tank to the manifold.) Such losses can be reduced (in percentage terms) if a common storage tank is used to supply more than one apparatus according to the invention. Thus in such situations where three or more apparatuses according to the invention are supplied from a common vacuum-insulated storage vessel via a common vacuum-insulated pipeline, we believe we can achieve utilisation efficiencies of greater than 90%, and even when one apparatus is so supplied, the utilisation efficiency is typically greater than 80%.

Preferably, the temperature of the mixture entering the manifold is below $-35°$ C. We have found it possible to maintain temperatures at this level using less than 25% by volume of liquid cryogen in the mixture with the air. By employing a vacuum-insulated mixing chamber and a vacuum-insulated manifold we are able to keep the temperature of the gas mixture along the length of the manifold uniform even at temperatures below minus 35° C.

The cryogen used herein is agron or nitrogen. Nitrogen is generally preferred for reasons of cost.

The air is preferably supplied to the mixing chamber at an average dew point below the temperature at which the gas mixture enters the manifold. This practice reduces the amount of ice that is formed in the process.

Once, however, the air is dried to a dew point below $-50°$ C., the amounts of moisture in it tend to be so low that supplying the air at a dew point higher than the temperature at which the gas mixture enters the manifold becomes more acceptable.

The flow rate of liquid cryogen into the mixing chamber is preferably controlled by a single flow control valve which preferably responds to signals generated by one or more temperature sensors located in the manifold or its inlet, or both.

The manifold preferably has a single inlet which is typically centrally located.

The manifold outlets typically communicate with blowing or cooling heads which are able to be moved into and out of register with the blow moulds. To enable such movement to take place, each outlet preferably receives one end of a flexible, thermally insulated, preferably vacuum-insulated, conduit the other end of which is attached to the blowing head associated with that outlet.

The drier preferably includes adsorbent or desiccant, or both. If desired, a chiller may be located upstream of the desiccant or adsorbent.

Preferably the apparatus according to the invention includes means for by-passing the drier and for shutting off the supply of liquid cryogen to the mixing chamber. Accordingly, if desired, the apparatus according to the invention may simply be converted to conventional ambient temperature operation.

The mixing chamber preferably comprises a vacuum-insulated pipe having a bend in it at its downstream end.

Operation of the method and apparatus according to the invention have been found in practice to produce one or both of an increase in the production of glass bottles on a "blow and blow" moulding machine and an increase in quality, that is to say a reduction in the percentage of bottles rejected as being below standard. The method and apparatus according to the invention may also be used in the production of glass containers on a 'press and blow' moulding machine.

BRIEF DESCRIPTION OF THE DRAWING

The drawing is a schematic representation of the gas supply system of the invention.

DETAILED DESCRIPTION OF THE INVENTION

A method and apparatus according to the present invention will now be described by way of example with reference to the accompanying drawing. Referring to the drawing, which is not to scale, a blower or compressor 2 supplies a stream of air typically at a pressure of from 2 to 4 atmospheres absolute to a conduit 4 which communicates with a drier 8. The inlet temperature of the air may typically be in the range 30° to 40° C. which is indicative of the hot environment in which glass moulding machines are normally operated. The conduit 4 has a manually or automatically operable stop valve 6 located therein. A similar stop valve 10 is located at the outlet end of the drier 8. There is also a by pass conduit 12 which enables the air flow, if desired, to by-pass the drier 8. The by-pass conduit 12 has another stop valve 14 located therein similar to the stop valves 6 and 10. There is typically a filter 5 located intermediate the stop valve 6 and the drier 8.

The drier 8 is preferably of a kind that employs a plurality of beds of adsorbent and/or desiccant. The illustrated embodiment of the drier 8 comprises vessels 7 and 9 containing beds 11 and 13 of particulate material. Each bed comprises a lower layer (now shown) of desiccant particles (alumina) and an upper layer (not shown) of molecular sieve particles, the molecular sieve being a zeolite which is capable of adsorbing water vapour from air. By using a desiccant and/or molecular sieve in such a way it is possible to achieve average dew points of below $-40°$ C. The drier 8 has a conventional arrangement whereby one bed is used on production while the other bed is being regenerated, the beds being switched between production and regeneration at chosen times. The regeneration is typically performed by depressurising and heating the respective bed. That is to say the drier operates on a heat regenerative cycle. It is also possible to employ a drier that operates on a pressure swing alone, that is it say that adsorption of the water vapour takes place at a first higher pressure and regeneration takes place at a second lower pressure without there being any substantial temperature difference between adsorption and desorption. With a drier that operates on the heat regenerative principle, there is a tendency for the resulting dried air to vary in temperature with the drier cycle. Thus, a bed immediately after having been regenerated will be at a higher temperature than its average operating temperature. As air flows through the bed so the bed tends to fall in temperature and it may reach a steady state. If exceptionally low dew points are required, say below $-60°$ C., it may be desirable to employ a chiller to dehumidify the air upstream of the drier 8. Accordingly, the air will enter the drier at a dew point of about 0° to 10° C. and this facilitates removal of all but the last traces of water vapour from the air. However, in normal operation we believe the use of such a chiller, and its associated expense, to be unnecessary.

Dried air is supplied from the drier 8 to a conduit 18 which terminates in a vacuum-insulated mixing chamber 20. The chamber 20 is in the form of a length of vacuum-insulated pipe having a bend 19 in it. As shown in the drawing, a major portion 21 of the chamber 20 is horizontal, but this is not essential. The bend 19 extends between the portion of the mixing chamber 20 and a vertical outlet portion 23.

The mixing chamber 20 communicates not only with a source of air but also with a source of liquid cryogen (liquid nitrogen). There is a vacuum-insulated tank 22 containing a large volume of liquid nitrogen. The tank 22 is typically provided with pressure raising means (e.g. an evaporator coil (not shown)) for raising the pressure at which the liquid nitrogen is supplied to a suitable value for its introduction into the mixing chamber 20. An outlet 24 of the tank 29 communicates with a vacuum-insulated pipeline 26. There is typically a manually or automatically operable stop valve 27 associated with the outlet 31 to enable the tank 29 to be shut off from the mixing chamber 20. An automatically operable flow control valve 28 is located in the pipeline 26. The pipeline 26 terminates in a T-piece 30 (which need not be vacuum-insulated) having vertical arms 32 and 34 which have automatically operable stop valves 36 and 38 (typically solenoid valves) respectively located therein and which terminate respectively in liquid supply nozzles 40 and 42 (illustrated on schematically in the drawing). The nozzles 40 and 42 may each simply comprise a member having an orifice of defined diameter extending therethrough.

In operation, it is typically arranged that only one of the valves 36 and 38 is open at any one time, and that neither of such valves remains open for longer than a predetermined period of time. This ensures that any ice depositing on the supply nozzles 40 and 42 will not adversely effect operation of the apparatus. During each period in which the respective one of the valves 36 and 38 is not conducting liquid cryogen to the mixing chamber, the flow of air over the respective nozzle 40 or 42 will cause any deposits of ice to melt or sublime. Thus, the liquid nitrogen will flow through one of the valves 36 and 38 and its respective nozzle 40 or 42 into the mixing chamber 20 whereupon it encounters a flow of relatively warm air (typically at a temperature in the order of 40° C.) and largely evaporates instantaneously. Some small droplets of nitrogen may however be entrained in the air flow. By forming the mixing chamber 20 with the bend 19 total evaporation of such droplets of liquid nitrogen is facilitated before they leave the mixing chamber 20 through as outlet 44.

The outlet 44 of the mixing chamber is joined to a vacuum-insulated inlet 46 of a vacuum-insulated manifold 48. The manifold 48 comprises a generally horizontally disposed chamber which typically has an internal diameter of at least 7.2 cm (3″) and a length of at least 5 meters. The single inlet 46 is preferably centrally located. The manifold 48 has a plurality of spaced apart vacuum-insulated outlets 50. The number of outlets is equal to the number of mould sections 60 of a moulding machine (not generally shown) into which it is desired to supply blowing gas. Each outlet 50 drops vertically from the manifold 48 and has associated therewith a manually or automatically operable stop valve 52 and (below the stop valve 52) a timer valve 54 whose opening and closing is typically controlled by the operating cycle of the moulding machine. Downstream of the valve 54, each outlet 50 receives an insulated flexible hose 56 which terminates in a blow head 58 that has means (not shown) providing for the inlet and outlet of gases from a respective mould 60 of the moulding machine. Each blowing head 58 is able to be raised and lowered and forms part of the moulding machine which is of conventional type. The flexible conduits 56 are thermally insulated, preferably by vacuum-insulation, though this is not essential and in experiments that we have done with an apparatus such as is shown in the drawing, we did not use vacuum-insulated hoses.

At least one temperature sensor 62 is located in the manifold 48. As shown in the drawing, there are three such temperature sensors 62. One is located in the inlet 46 and the two others located equidistantly from the inlet 46 in the manifold 48 itself. The temperature sensors 62 are operatively associated with the control valve 28 by means of a controller 64. The arrangement is such that the control valve 28 is set so as to maintain a chosen constant set temperature, which is preferably below $-35°$ C. Since the temperature of the air entering the mixing chamber tends to fluctuate by virtue of the operation of the heat regenerative drier 8, the automatic control of the liquid nitrogen injection into the mixing chamber 20 is a desirable feature of the apparatus. The control arrangements may be such as to shut off supply of all liquid nitrogen, e.g. by closing both the valves 36 and 38 upon the temperature as sensed deviating by a chosen amount from a set temperature, or upon the readings given by the different sensors 62 varying from one another at any one time by more than a chosen amount. The equipment needed to effect such control measures is well known in the art of cryogenics and will therefore will not be described herein. If the supply of liquid cryogen is shut down, the apparatus may still continue to function, and if desired, the air drier can be by-passed.

In the above described apparatus, all vacuum-insulated parts also include superinsulation within the vacuum insulation. Superinsulation comprises alternate layers of reflective metal and plastics.

In a moulding operation, a partially formed bottle or other container is transferred to each of the moulds 60. The moulding machine then automatically lowers the heads 58 into registry with the mould 60. On achieving this registry, the timer valves 54 automatically open and stay open for a set period of time, which can be varied by the operator but which is generally only a few seconds (say between 2 and 6 seconds) long. Throughout this period cold gas is supplied from the manifold 48 and blows each bottle to its final shape and at the same time cools the glass thereby accelerating solidification of the bottle. At the end of the blowing period, the valve 54 is closed again and the head 58 removed from registry with the mould 60. Each mould section 60 is operated in sequence enabling the moulding machine to be operated continuously over a prolonged period of time.

In our experiments we have obtained an average efficiency of liquid nitrogen utilisation of over 80%. The efficiency is defined as the amount of liquid cryogen required to cool the air to the chosen temperature divided by the total amount of liquid cryogen used. Moreover, we have been able to increase the rate of production of the bottles and reduce the rejection rate.

We claim:

1. A method of cooling a plurality of hot glass containers that have been hot shaped and at least partly formed in moulds, comprising the steps of drying a stream of air, passing the dried air into a vacuum-insulated mixing chamber, evaporating liquid cryogen selected from the group consisting of liquid nitrogen and liquid argon in the mixing chamber, allowing the resulting evaporated cryogen to mix with the dried air to form a mixture at a temperature below minus 20° C., passing the cooled gas mixture into a vacuum-insulated manifold, and causing the cooled gas mixture to flow from the manifold and into said glass containers while they are in said moulds.

2. A method as claimed in claim 1, in which the flow rate of cooled gas mixture into each glass container is less than 2.5 cubic meters per minute.

3. A method as claimed in claim 1 or claim 2, in which the temperature of the gas mixture is below minus 35° C.

4. A method as claimed in claim 1 or claim 2 in which the gas mixture contains less than 25% by volume of evaporated liquid cryogen.

5. A method as claimed in claim 1 or claim 2, in which the dried air has a dew point below the temperature at which the gas mixture enters the manifold.

6. A method as claimed in claim 1 or claim 2, in which the air is dried using a desiccant or a molecular sieve, or both.

7. A method as claimed in claim 1 or claim 2, in which a uniform temperature is maintained in the gas mixture along the length of the manifold.

8. A method as claimed in claim 1 or claim 2, in which the liquid cryogen is liquid nitrogen.

* * * * *